March 3, 1959 B. A. HARRIS 2,876,290

DISCRIMINATING CIRCUIT

Filed Dec. 31, 1956 3 Sheets-Sheet 1

INVENTOR
B. A. HARRIS
BY Francis E. Blake
ATTORNEY

March 3, 1959 B. A. HARRIS 2,876,290

DISCRIMINATING CIRCUIT

Filed Dec. 31, 1956 3 Sheets-Sheet 3

United States Patent Office 2,876,290

Patented Mar. 3, 1959

2,876,290

DISCRIMINATING CIRCUIT

Ben A. Harris, Rochester, N. Y., assignor to General Dynamics Corporation, Rochester, N. Y., a corporation of Delaware Application December 31, 1956, Serial No. 631,568

12 Claims. (Cl. 179—18)

This invention relates to telephone systems and particularly to signaling means for discriminating between incoming and outgoing traffic over any given line.

The object of the invention is to provide means associated with a given circuit which will, during the use thereof, indicate the direction in which the circuit is being used, and specifically, by way of example, whether the circuit is involved in an incoming or an outgoing call.

It is conventional in telephone systems to have a line circuit as part of each line, this circuit containing essentially a line relay which will signal an outgoing call from the line and a cut-off relay which will disconnect this line relay from the line when other proper switching arrangements have been made. Usually, on outgoing calls the operation of the line relay serves to bring a line finder into operation which makes a connection to the calling line and extends it to a selector which may thereupon be selectively operated over the calling line. The line circuit also has terminals appearing in connectors whereby incoming connections may be established to the line.

Immediately the line circuit has been seized on either an incoming call or an outgoing call, all terminals appearing in other locations must be marked as busy and hence the private wire or the sleeve as it is known will be characterized by a busy potential. Thus, during the use of the line a single condition is established to denote a call, be it incoming or outgoing.

It is desirable to know the character of a call and hence the means of the present invention is provided to differentiate between the two kinds of call. In accordance with this means advantage is taken of a slight difference in the establishment of the call and this difference is employed to register the character of the call. On an incoming call all the sleeve terminals of the line, both those in the connector banks and those in the line finder banks are immediately grounded with the result that a discriminating relay is prevented from operating. On an outgoing call, however, the sleeve terminals in the connector banks are immediately grounded but the like terminals in the line finder banks are temporarily connected to battery as a condition for which the line finder seeks. This interval is transitory as the finder may act very quickly—yet brief as it may be the discriminating relay will operate and will lock to the ground applied to the sleeve in the connector bank. The difference between an incoming call and an outgoing call is that there is a transitory operation of the line relay on an outgoing call and some result of this is translated into an indication of an outgoing call.

Thus during the existence of the call either an incoming or an outgoing signal may be operated. This signal may take various forms, being either a simple lamp signal or a register by which the number of incoming and number of outgoing calls may be toted up.

A feature of the invention is a discriminating relay means added to a line circuit for indicating the character of a call and depending for its energization on a slight delay in the extension of a busy signal to a certain terminal which invariably is marked as busy regardless of the character of a call, no such slight delay being present in a call of a different character.

Another feature of the invention is the use of a discriminating relay operated by a line calling condition and locked into operation by a line called condition. Where the call is an incoming call, that is the line is playing the role of a called line, a line called condition is immediately placed on the line finder terminals of the line, but where the call is outgoing from the line, a line calling condition is placed on the line finder terminals so that the finder may discover this particular line and extend it to a selector.

Another feature of the invention is a circuit having a line relay, a cut-off relay and a discriminating relay responsive in its initial operation to the operation of said line relay and responsive in its continued operation to the continued operation of said cut-off relay. The discriminating relay will only operate while the line relay is operated, but after the discriminating relay has operated it depends for its continued energization on a circuit through a back contact of the line relay and a locking contact of the cut-off relay. Therefore it may be stated that the discriminating relay follows the line relay and holds with the cut-off relay.

Another feature of the invention is a discriminating relay having two windings, one of which is connected to one pole of a battery while the relay is unoperated but is switched to the other pole of the battery while the relay is operated and the other of which acts as a holding winding. A unique circuit arrangement resides in the connections whereby the circuit of the holding winding is momentarily broken after the first winding is switched from one pole of the battery to the other so that this first winding acts as a holding winding during that interval in which the circuit of the holding winding is interrupted. Thus the discriminating relay is provided with an energizing winding and a holding winding and has circuit changing means for causing the energizing winding to act as a holding winding after its duties as a means for energizing the relay have been completed and particularly during a following switching period in which the circuit of the holding winding is momentarily interrupted.

Another feature of the invention is the employment of a transitory time interval during the release of the line relay for making a circuit change which spells the difference between an incoming and an outgoing call. Thus on the establishment of an outgoing call where the line relay had been operated, the transfer of the connector sleeve circuit from one ground to another includes a transitory break and this break is employed to release a fast acting relay and to thus make a circuit change.

Two different embodiments of the present invention are shown in each of which the transitory operation of the line relay is employed to register the call as outgoing rather than as incoming.

Further in accordance with the present invention the unique indicating means of the present invention is shown as the essential element of a traffic recorder circuit whereby any given group of lines may be put under observation and a continuing record of the condition of each made over an indefinite period at very short intervals. In a preferred embodiment of the invention the condition of each line of a group is noted at ten second intervals, and a composite record taken of the number of incoming calls and outgoing calls existing during any half hour period.

Other features will appear hereinafter.

The drawings consist of three sheets having seven figures, as follows:

Fig. 1 is a schematic circuit diagram indicating various components in a telephone system and showing in detail a line circuit and its connections to the means for establishing incoming and outgoing calls;

Fig. 2 is a circuit diagram of a means which may be connected to a line circuit and which will indicate during a use of the associated line the nature of the call, i. e. an incoming or an outgoing call;

Fig. 3 is a diagram of a similar circuit used for the same purpose, but in which the indication is produced in a different manner;

Fig. 6 is a block diagram showing how the three sheets of drawings are to be placed to provide a complete schematic circuit diagram of one form of the invention in which Fig. 3 is used, and;

Fig. 7 is a block diagram showing how the same three sheets of drawings are to be placed to provide a complete schematic circuit diagram of another form of the invention in which Fig. 2 is used.

Figures 1, 2, 3, 6, 7:
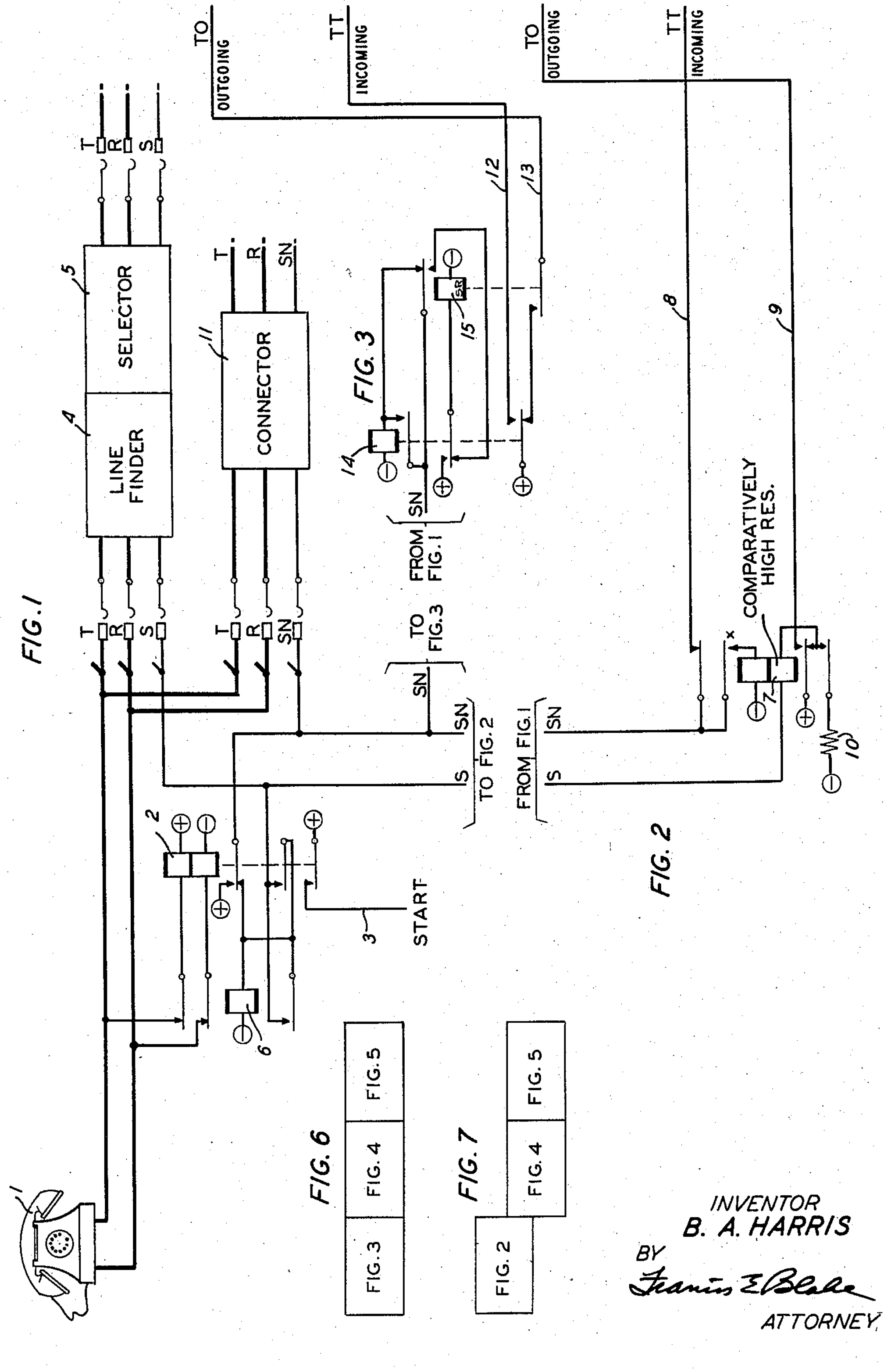

In a telephone system a subscriber at station 1 may establish a connection to another subscriber by conventional means. By lifting his telephone from its cradle he will place a bridge on his line and cause the operation of the line relay 2. This will place a ground on the start wire 3 to operate the allotter (not shown) which will start the line finder 4 and which in time will pick up the calling line and extend the connection to the selector 5. When the finder 4 seizes the calling line a ground will be returned over the sleeve S and this will be extended to the cut-off relay 6, first through a front contact and armature of the line relay 1 and immediately thereafter over a front contact and armature of the cut-off relay itself. Upon the operation of the cut-off relay 6, the line relay 2 will be released.

It is to be noted that in the interval between the operation of the line relay 2 and the cut-off relay 6, a circuit may be traced from battery, the winding of the cut-off relay 6, an armature and front contact of the line relay 2, the lower comparatively high resistance winding of relay 7, a back contact and armature of this relay to ground which will result in the operation of this relay.

Also, upon the operation of the line relay the sleeve conductor SN of this line circuit extending into the connector bank terminals is grounded by a front contact of the line relay so that upon the operation of fast acting preliminary contact, marked X, of the relay 7 a holding circuit for relay 7 will be completed through its upper winding which will result in the very positive action of this relay.

It should be noted that upon the operation of the line relay 2 and the consequent grounding of the sleeve SN conductor, a circuit is momentarily established to the incoming TT wire 8, but it will be understood that this circuit is maintained for only a fleeting instant since the relay 7 operates immediately and opens the circuit to the wire 8. Instead, a solid connection will be made from ground, a lower armature and front contact of relay 7 to the outgoing TO wire 9, so that as a result of an outgoing call made from the substation 1, the outgoing wire 9 will be grounded and this condition will be maintained for the duration of the call. Through the operation of the relay 7 a source of battery through a resistance 10 will be connected to the lower winding of the relay 7 to hold this relay operated during the instant that ground is removed from the SN conductor as the line relay is releasing. Thus an outgoing call from the station 1 is registered by the grounding of the TO1 wire 9 in Fig. 2.

On an incoming call to station 1 by way of the connector 11, the SN sleeve conductor is grounded to cause the immediate operation of the cut-off relay 6 and this ground is also extended through a front contact of this relay to the S sleeve conductor but since in its unoperated condition the lower winding of relay 7 is also connected to ground, this relay 7 will not operate. In this case the incoming TT wire 8 will be grounded and thus an incoming call will be registered by the grounding of the TT incoming lead.

Hence it appears that the relay 7 will discriminate between an outgoing call and an incoming call, though during either such a call, both sleeve S and sleeve SN are grounded. The discrimination comes through the preliminary and transitory battery connection to the sleeve S during the line finding operation.

Fig. 3 shows another means for discriminating between an incoming call and an outgoing call, in which the incoming TT wire 12 or the outgoing TO wire 13 is grounded during a call. In this case the discrimination is made, not by taking advantage of the fleeting battery connection to the S lead but rather by the fleeting removal of ground from the SN lead as the line relay 2 releases after the operation of the cut off relay 6. In accordance with this embodiment of the invention, the SN lead is immediately grounded for any call, either incoming or outgoing. Thereupon a fast acting relay 14 is first operated through a back contact of a slow release relay 15 and then locked to the ground on the SN lead independent of the relay 15. The operation of the relay 14 results in the operation of the relay 15 and the grounding of the incoming TT lead 12 and if both relays 14 and 15 are left in this condition the ground maintained on the lead 12 will mark this as an incoming call.

However, if it is in fact an outgoing call, then the original grounding of the SN lead would have resulted from the operation of the line relay 2, so that as the calling line is picked up by the line finder 4 and the cut off relay 6 is operated, then the line relay 2 is released. During this operation the SN lead is disconnected from ground for a fleeting instant and within such time interval the fast relay 14 will release, the slow releasing relay 15 holding operated until its locking circuit is completed through a back contact of relay 14. With relay 14 released and relay 15 operated, the outgoing TO conductor 13 will become grounded to mark this as an outgoing call.

In both Figs. 2 and 3, at the termination of the call, either incoming or outgoing the operated relay or relays will be released and ground removed from the incoming or the outgoing wire.

Figure 4:
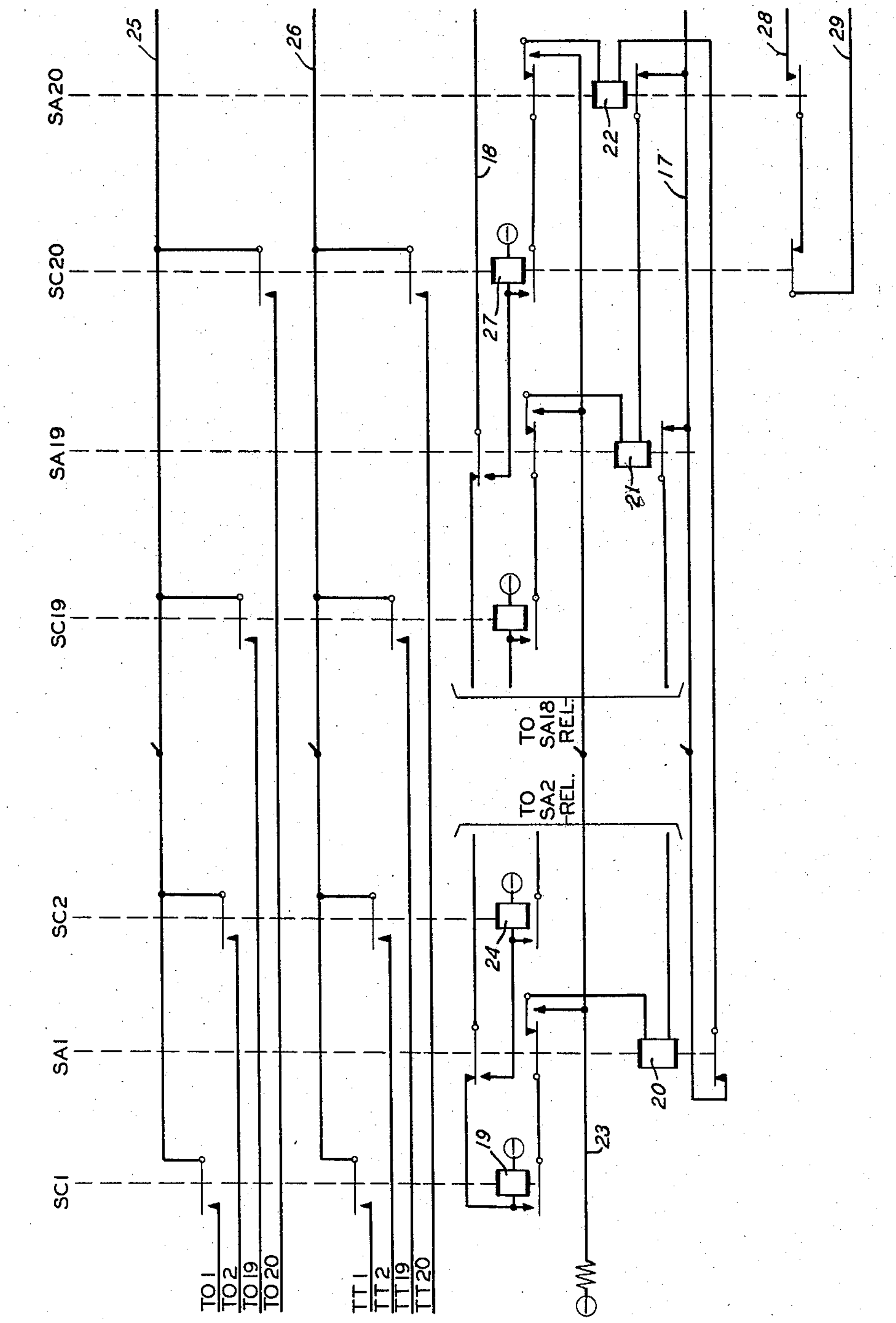
Fig. 4 is a schematic circuit diagram of a selecting means by which the separate line circuits of a group may be successively scanned.

It may be noted that this indication of the nature of a call may be employed for any given purpose. Lamps connected to the incoming TT leads and the outgoing TO leads will provide a visual indication. Another specific employment of this indication is disclosed in Figs. 4 and 5 where a means for collecting traffic data is shown. Fig. 4 shows a selector whereby during successive time intervals a complete group of line circuits may be scanned so that a record of traffic conditions may be made. For the purpose of explaining the operation of the selector of Fig. 4 it will be noted here that under given conditions which will be explained more in detail hereinafter, the PL relay 16 in Fig. 5 will operate over a cycle at the rate of 120 operations per minute, during which a ground will be steadily applied to conductor 17 and intermittently applied to conductor 18.

On the first application of ground to these two conductors a circuit will be extended from conductor 18 and thence in a chain over armatures and back contacts of relays SA19 through SA1 inclusive to the winding of the SC1 relay 19. This ground will then be also extended over a front contact of the SC1 relay 19 through a back contact of the SA1 relay 20, the winding thereof in a circuit which at this time is ineffective since the other terminal of this winding is connected to ground over a back contact of the SA2 relay to ground on the conductor 17, in a circuit such as that extending from the winding of the SA19 relay 21 to a lower armature and back contact of the SA20 relay 22.

When the relay 16 releases and removes ground from the conductor 18, relay 19 remains operated in series with relay 20 and relay 20 becomes operated. As relay 20 operates it locks to battery on conductor 23 and opens the circuit of relay 19 which thereupon releases. Relay 20 rearranges the circuit from conductor 18 so that when ground is next applied thereto the SC2 relay 24 will be operated.

It is to be noted that during the operation of the SC1 relay, the TO1 conductor is connected to the outgoing line 25 and the TT1 conductor is connected to the incoming conductor 26. As the impulse over conductor 18 comes to an end then the SC1 relay is released as above described and the connection of the conductors 25 and 26 to a first line circuit is terminated. During the succeeding operation of the SC2 relay these conductors are extended to a second line circuit and it is believed to thus be clear that the various line circuits of a group are successively extended to a recording circuit reached over these conductors 25 and 26.

It is to be noted that there is no overlap between the operation of such relays as the SC1 relay 19 and the SC2 relay 24 so that no two line circuits may be simultaneously connected to the recording circuit.

The SA1 relay 20 is locked in a circuit including its own armature and front contact and an armature and back contact of the next SA2 relay (not shown) so that when in turn the SA2 relay is operated, the SA1 relay 20 will be released to provide a circuit for the eventual operation of the SA20 relay 22.

It will appear hereinafter, that when the SA20 relay 22 operates and the SC20 relay 27 releases at the end of a scanning operation a circuit will be closed between conductors 28 and 29 to advance the operation of the circuits as will shortly be explained.

Figure 5:
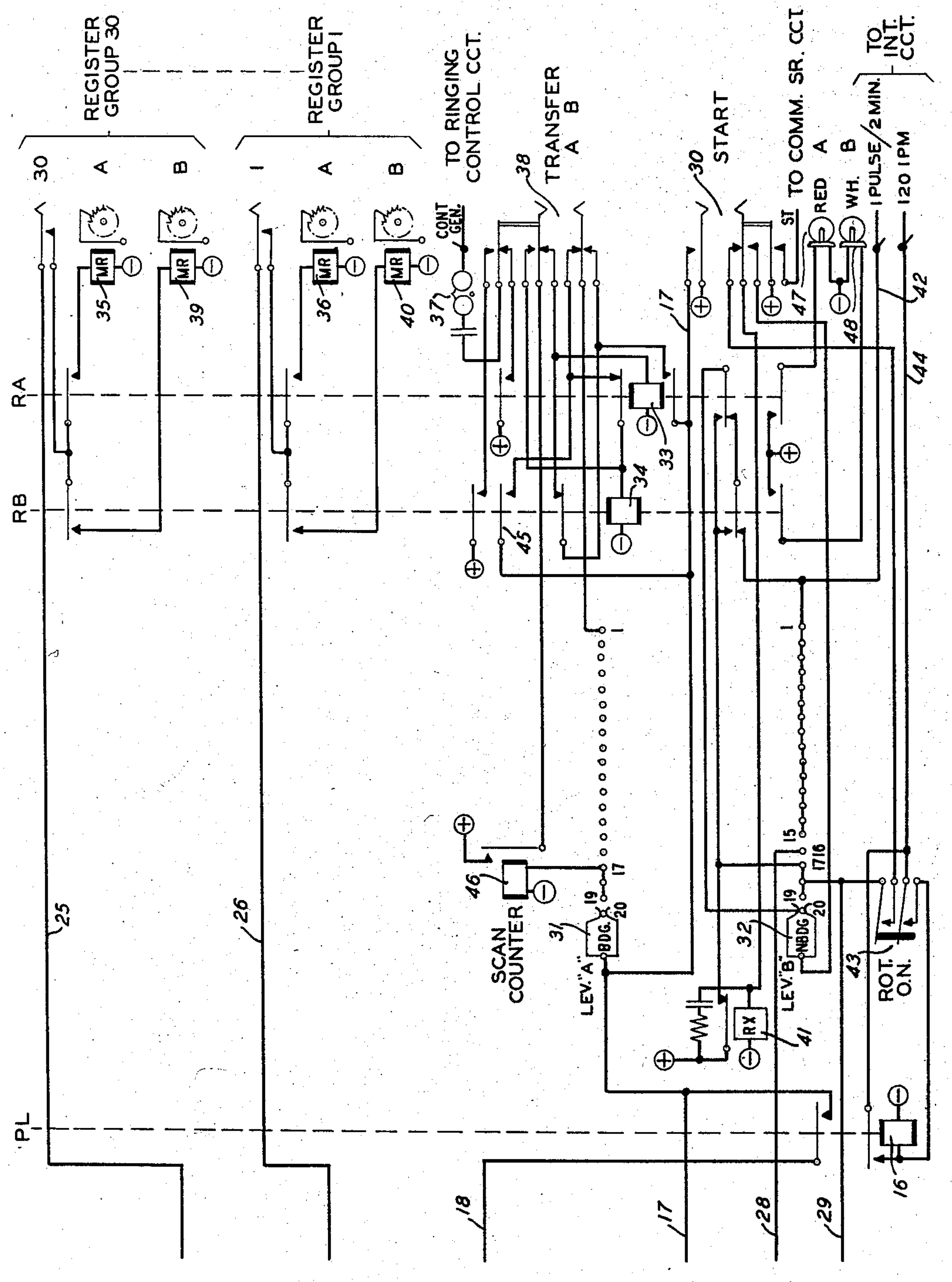
Fig. 5 is a schematic circuit diagram of a means to make a record of what is found in a recording cycle and a means to control the said scanning means.

Looking now at Fig. 5, it will be noted that a start key 30 is provided which upon operation will start a registering operation and through its locked in continued operation will enable the circuit. This circuit consists essentially of a rotary stepping switch having two sets of twenty contacts each. The wipers 31 of level A are of the bridging type and will move step by step over contacts 1 to 16 inclusive at the rate of one step every two minutes and thus complete one cycle of operation in thirty minutes. The wipers 32 of the nonbridging type move with the wipers 31. When the key 30 is operated the RB relay 34 will be operated and will thereby connect the register 39 to the wire 25 and the register 40 to the wire 26 so that for a half hour the line circuits associated with this circuit may be scanned once each ten seconds. At the end of this operation a warning bell 37 will be sounded, whereupon an attendant will operate the transfer key 38 to transfer from the B to the A registers so that during the next half hour the relay 33 will be operated and the registers 35 and 36 will be connected to the wires 25 and 26 respectively. During this time the attendant may take readings from the registers 39 and 40 and reset them to zero—ready for a new operation.

When the start key 30 is operated a circuit is established from battery, the magnet 41 for the stepping switch, the lower operated contacts of the switch 30, the wiper 32 on its resting contact 20, the armatures and back contacts of the RA relay 33 and the RB relay 34 to the lead 42 over which one pulse every two minutes is delivered. On the first of these pulses the magnet 41 will be energized and when the pulse is terminated the wipers 31 and 32 will move to the number 1 contacts of the switch. In this position a ground is placed on wiper 31 from the wire 17 now grounded by the key 30, and this ground will be extended by way of the number 1 contact of level A of the switch through the lower normal contacts of the transfer key 38, an armature and back contact of the RA relay 33 to the winding of the RB relay 34 and thence to battery. Relay 34 operates and locks through its armature 45 and front contact to the ground on wire 17.

As the wipers of the switch move to their number 1 contacts the rotary off normal switch 43 operates and this connects the 120 I. P. M. lead 44 to the PL relay 16 so that the counting relays of Fig. 4 operate as in a ring circuit completing a cycle each ten seconds.

Since the switch is moved forward under the control of its wiper 32 connected to the lead 42 over which one pulse is delivered every two minutes, it will take thirty minutes for the wiper to reach its contact number 16 and during this half hour the line circuit indications of incoming and outgoing calls will have been scanned 180 times whereby an accurate determination of the traffic conditions may be made and recorded on the registers 39 and 40.

Upon the movement of the wiper 32 on to the sixteenth contact of level B and thereafter upon the operation of the SA20 relay 22 and the release of the SC20 relay 27, a circuit will be completed from the switch magnet 41, the operated contacts of the start key 30, wiper 32, its sixteenth contact lead 28, a front contact of relay 22, and a back contact of relay 27, lead 29 to the switch contacts 17, 18 and 19 and thence to the back contact and armature of the switch magnet 32 whereby the switch is started on an automatic movement over its contacts 17, 18 and 19 to end up on its contact 20. During its travel over contacts 17, 18 and 19 the bridging wiper 31 will cause a single operation of the scan counter 46. The operation of the scan counter will cause the operation of the RA relay 33, thus releasing the RB relay 34 and the registers 35 and 36 will be enabled, whereby the continued operation of the counting relays of Fig. 4 and the stepping switch of Fig. 5 will now start the accumulation of data on the A registers. At this time, the operation of the RA relay 33 will close a circuit for the alarm bell 37. The attendant will thereupon operate the transfer key 38 to silence the bell 37, and prepare the circuits for a similar response at the end of this next thirty minute period. It may be noted that the lamps 47 and 48 will give an indication of which set of registers are in operation at any given time.

It is believed that with this explanation it will be clear how the switch having wipers 31 and 32 will continuously operate over thirty minute cycles and how at the end of each cycle the other set of registers will be enabled and the alarm bell 37 operated. At this time the operator will move the transfer key to its other position and proceed to record the readings of the registers which have just completed a cycle, and to reset them ready for a next cycle.

What is claimed is:

1. In a telephone system, a line circuit having a line relay, a cut-off relay, and discriminating relay means for signaling the incoming or outgoing nature of a call during the continued operation of said cut-off relay, said discriminating relay means being responsive to an operation of said line relay, prior to an operation of said cut-off relay.

2. In a telephone system, a line circuit for each of a plurality of lines therein, each said line circuit having a line relay responsive to an outgoing call from its said associated line and a cut-off relay responsive to both an outgoing and an incoming call to said associated line and relay means responsive to an operation of said line relay prior to an operation of said cut-off relay for signaling an outgoing call from said associated line.

3. In a telephone system, a line circuit having a line relay, a cut-off relay and a discriminating relay, means controlled by said line relay for operating said discriminating relay and means controlled by said cut-off relay for holding said discriminating relay.

4. In a telephone system, a line circuit having a line relay, a cut-off relay and a discriminating relay, means controlled by said line relay for operating said discriminating relay, means controlled by said cut-off relay for holding said discriminating relay and means controlled by said discriminating relay for indicating an outgoing call in which said line relay is momentarily operated and for indicating an incoming call in which the operation of said line relay is prevented.

5. In a telephone system, a subscriber line circuit including a line, a line relay responsive to the initiation of an outgoing call and a cut-off relay for cutting off said line relay from said line on either an incoming or an outgoing call, indicating means for signaling either an incoming or an outgoing call, discriminating relay means for controlling said indicating means, means controlled by said line relay for operating said discriminating relay means and means controlled by said cut-off relay for maintaining said established indication.

6. In a telephone system, a subscriber line circuit including a line, a line relay responsive to the initiation of an outgoing call and a cut-off relay for cutting said line relay off said line on either an outgoing or an incoming call, a discriminating relay for controlling means to indicate the incoming or outgoing nature of a call, said discriminating relay having a comparatively high resistance operating winding, a holding winding and switching means for providing a holding circuit through said operating winding for temporarily holding said discriminating relay operated over a momentary break in the circuit of said holding winding.

7. In a telephone system, a line, a line circuit having a line relay responsive to the initiation of an outgoing call from said line and a cut-off relay for cutting said line relay off of said line responsive to either an outgoing or an incoming call on said line, a bank of outgoing call terminals for said line including a sleeve terminal, a bank of incoming call terminals for said line including a sleeve terminal, a discriminating relay having an operating winding and a holding winding, said operating winding being connected to said outgoing sleeve terminal and said holding winding being connected to said incoming sleeve terminal.

8. In a telephone system, a line, a line circuit having a line relay responsive to the initiation of an outgoing call from said line and a cut-off relay for cutting said line relay off of said line responsive to either an outgoing or an incoming call on said line, a bank of outgoing call terminals for said line including a sleeve terminal, a bank of incoming call terminals for said line including a sleeve terminal, a discriminating relay having an operating winding and a holding winding, said operating winding being connected to said outgoing sleeve terminal and said holding winding being connected to said incoming sleeve terminal and means for indicating the outgoing or incoming nature of a call controlled by said discriminating relay.

9. In a telephone system, a line, a line circuit including a line relay responsive to the initiation of an outgoing call from said line and a cut-off relay for cutting said line relay off of said line responsive to either an outgoing or an incoming call on said line, a bank of outgoing call terminals for said line including a sleeve terminal, a bank of incoming call terminals for said line including a sleeve terminal, a discriminating relay having a comparatively high resistance operating winding connected to said outgoing sleeve terminal and a winding in a holding circuit connected to said incoming sleeve terminal, said incoming sleeve terminal being connected to a transfer armature of said line relay, having a front contact connected to a source of busy potential and a back contact connected to said cut-off relay and said outgoing sleeve terminal being connected to make contacts of both said line and cut-off relays for connecting said outgoing sleeve terminal to said cut-off relay.

10. In a telephone system, a line circuit having a cut-off relay and a line relay, a private wire terminal controlled by said line relay, a discriminating circuit connected to said private wire terminal including two relays, both said relays being responsive to a connection made to said private wire and one of said relays being thereafter responsive to a transitory interruption of said connection and means for indicating either an incoming or an outgoing call responsive to the concurrent operation of both said relays or the continued operation of but one of said relays respectively.

11. In a telephone system, a line, a line circuit for said line including a line relay transitorily response to an outgoing call from said line and a cut-off relay continuously responsive during the continuance of either an incoming or an outgoing call from said line and means to indicate the nature of a call consisting of a pair of relays both responsive to the establishment of either an incoming or an outgoing call and one of said relays being released by the release of said line relay during the establishment of an outgoing call from said line.

12. In a telephone system, a plurality of telephone lines, a line circuit for each said line including a line relay and a cut-off relay, a discriminating circuit having an outgoing call lead and an incoming call lead, means responsive to the operation of said cut-off relay for establishing a given electrical condition on said leads, means responsive to a prior transitory operation of said line relay for confining the establishment of said given electrical condition to said outgoing call lead, a closed ring of counting relays for successively connecting the said outgoing call leads and the said incoming call leads to a pair of recording leads and means for recording the number of outgoing calls and the number of incoming calls encountered in a plurality of operations of said ring circuit over a given time period.

References Cited in the file of this patent

UNITED STATES PATENTS

| | | |
|---|---|---|
| 1,492,781 | Erickson | May 6, 1924 |
| 2,650,950 | Kessler | Sept. 1, 1953 |